Feb. 14, 1961　　　　S. WATKINS　　　　2,971,572
COMBINATION AUTOMOBILE ARM REST AND HAND BAG
Filed Sept. 15, 1958　　　　　　　　　　2 Sheets-Sheet 1

INVENTOR.
SAMMY WATKINS
BY
Sanfad Schnurmacher
ATTORNEY.

Feb. 14, 1961  S. WATKINS  2,971,572
COMBINATION AUTOMOBILE ARM REST AND HAND BAG
Filed Sept. 15, 1958  2 Sheets-Sheet 2
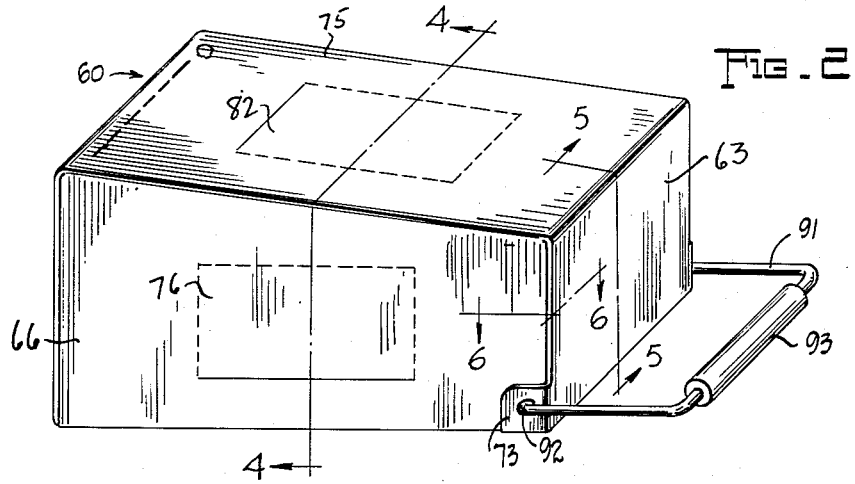
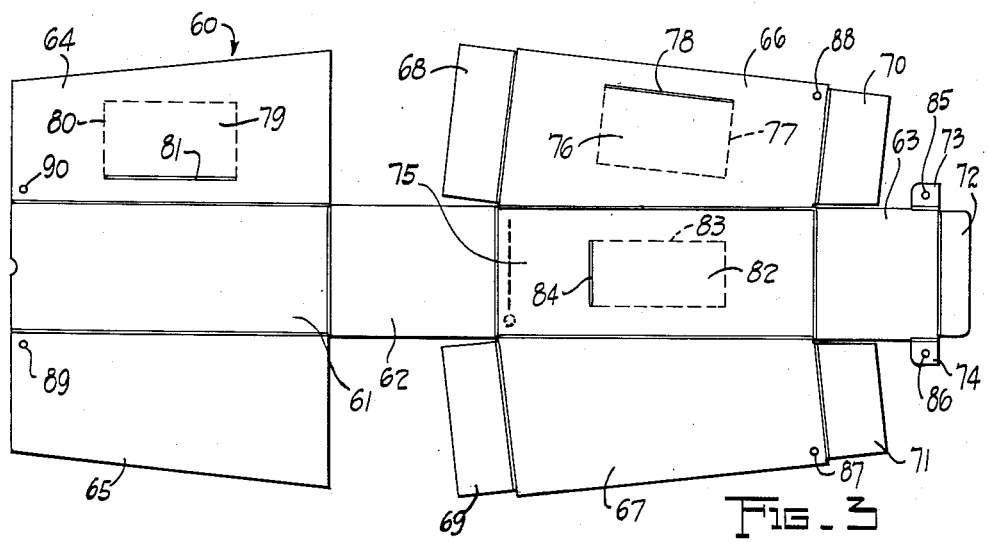
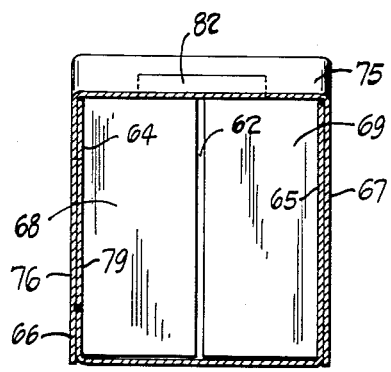
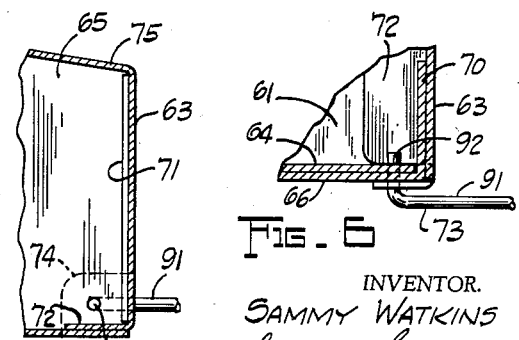
INVENTOR.
SAMMY WATKINS
BY
Sanford Schnurmacher
ATTORNEY

United States Patent Office 2,971,572
Patented Feb. 14, 1961

2,971,572

COMBINATION AUTOMOBILE ARM REST AND HAND BAG

Sammy Watkins, 3580 Washington Blvd., University Heights, Ohio

Filed Sept. 15, 1958, Ser. No. 761,245

2 Claims. (Cl. 155—198)

This invention relates to improvements in arm rests for automobile seats, or the like, and is particularly directed to provide a combination, storage compartment, hand bag and arm rest for such purposes.

The primary object of this invention is to provide a simplified means for associating an arm rest with a conventional automobile seat structure so that the rest may be readily attached or removed from the seat, and in operative position is secured thereto against lateral and longitudinal displacement by a handle depending rearwardly from the rest and secured between the back and seat cushions by their opposed yieldable pressures.

Another object is to provide a device of the type stated that has one or more openings through which articles may be deposited in the interior of the arm rest for safekeeping or storage.

Still another object is to provide a device of the type stated that may be removed from its position as an arm rest on an automobile seat and carried around by its handle in the manner of a hand bag.

A further object of the invention is to provide a combination hand bag and arm rest that is adaptable to the seat construction in all style of present day automobiles and which may be manufactured, in its preferred or modified forms, at a relatively low cost.

These and other objects of the invention will become apparent from a reading of the following specification and claims, together with the accompanying drawings, wherein:

Figure 2 is a perspective view of the same removed from the automobile seat, showing its carrying handle;

Figure 3 is a bottom plan view of the unitary sheet material blank from which the arm rest is formed;

Figure 4 is a cross-sectional view taken along the line and in the direction of the arrows 4—4 of Figure 2;

Figure 5 is a vertical sectional view taken along the line and in the direction of the arrows 5—5 of Figure 2; and Figure 6 is a horizontal sectional view taken along the line and in the direction of the arrows 6—6 of Figure 2.

Figure 1:
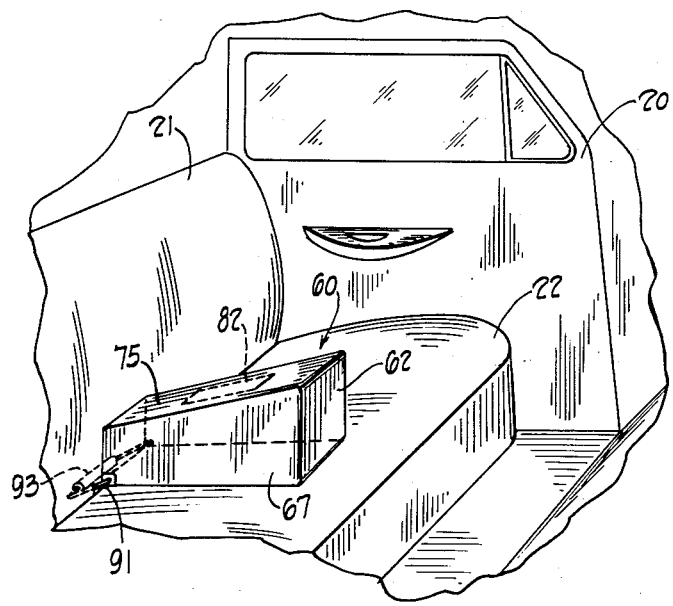
Figure 1 is a perspective view of the combination automobile seat arm rest and hand bag that is the subject of this invention as it appears in its operative position on the seat of a conventional automobile.

Referring more particularly to the drawing, there is seen in Figure 1 thereof the combination arm rest and hand bag that is the subject of this invention, broadly indicated by reference numeral 60.

Reference numerals 20, 21 and 22 indicate a section of a conventional automobile body, seat back and seat cushion, respectively.

The arm rest 60 has a rearwardly extending handle 91 pivotally attached thereto, as is seen in Figures 1, 2, 5 and 6.

The arm rest 60 is positioned on the seat cushion 22 with the handle 91 nested in the crevice between the seat 22 and the back cushion 21. The opposed yieldable surfaces of the back and seat cushions hold the handle 91 against lateral movement, thereby anchoring the arm rest securely in place, even though the rest may be relatively light in weight.

The device comprises a structure formed from a single, substantially rectangular, piece of sheet material, preferably corrugated cardboard, although any other suitable sheet materials may be used.

A single sheet of corrugated cardboard of suitable gauge is cut and scored to provide the blank illustrated in Figure 3.

The various panels, identified hereinafter, are scored along their edges of articulation so that they may be folded relative to one another to form the erect arm rest 60 illustrated in Figures 1 and 2.

The blank illustrated in Figure 3 comprises a bottom panel 61, a front panel 62, a top panel 75, a rear panel 63 and a tongue 72, all extending in a straight line, all of the same width and all articulated through score lines.

The rear panel 63 being of less area than the front panel 62 thereby imparting a downwardly and rearwardly directed slope to the top panel 75 in its hereinafter described erected condition. A pair of opposed inner side panels 64 and 65 are articulated to the opposite edge of the bottom panel 61.

A pair of outer side panels 66 and 67 articulated to the opposite edges of the top panel 75 adjacent to the front panel 62. The said outer side panels 66 and 67 having opposed end flaps 68, 70 and 69, 71 articulated to the paired front and rear edges thereof.

Reference numerals 73 and 74 indicate ears articulated to the opposite side edges of the rear wall.

Frangible door sections 76 and 79 are outlined on panels 64 and 66 respectively by perforations 77 and 80 terminating in hinge line scores 78 and 81. Similarly the top panel 75 has a frangible door section 82 defined by perforations 83 and hinge score 84.

Reference numerals 85, 88 and 90 indicate holes located in ear 73 and panels 66 and 64 respectively which are aligned when the blank is folded as described hereinafter. Similarly reference numerals 86, 87 and 89 designate alignable holes in ear 74 and panels 67 and 65 respectively.

The so scored and shaped blank is folded upon itself to provide a rigid hollow structure having front (62), rear (63) and side walls 66 and 67 and a top wall 75 extending backward and downward at an angle toward the bottom wall 61, from the front to the rear walls, with the rear wall ears 73 and 74 folded over the side walls 66 and 67 respectively at their junction with the bottom wall 61.

Reference numeral 91 indicates a handle having inturned ends 92 and a roller 93.

The handle is pivotally mounted on the so erected structure by passing its ends 92 through the aligned holes at the ears 73 and 74 as indicated in Figures 2, 5 and 6. The so mounted handle 91 acts to lock the structure in its erected condition. To use the structure as an arm rest the arm rest 60 is positioned on the seat with the handle roller 93 inserted in the crevice between the seat and back, as illustrated in Figure 1.

By referring to Figure 4 it will be noted that the frangible doors 76 and 79 of the inner (64) and outer (66) walls are aligned, so that by breaking along their perforations 77 and 80, access may be had to the interior of the container for storage of various small articles. Access through the top walls is similarly provided by frangible section 82.

The arm rest 60 may also be used as a hand bag by carrying it by its handle roller 93.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A combination automobile arm rest and hand bag, comprising a unitary rigid sheet material blank having a bottom panel, a pair of opposed inner side panels articulated to the opposite edges of said bottom panel, a front panel articulated to one of the other edges of said bottom panel, a top panel articulated to the front panel along the edge opposite the bottom panel, a pair of opposed outer side panels articulated to the opposite edges of the top panel adjacent the front panel, the said outer side panels having opposed end flaps articulated to the paired front and rear edges thereof, a rear panel articulated to the remaining edge of the top panel, said rear panel being smaller in area than the aforesaid front panel and having a pair of opposed ears articulated to the opposite side edges thereof and a tongue articulated along the remaining edge thereof, the said several panels, flaps and tongue of the blank being foldable relative to one another to provide a rigid hollow structure having front, rear and side walls and a top wall extending backward and downward at an angle toward the bottom wall, from the front to the rear wall, with the rear wall ears folded over the side walls at their junction with the bottom wall, and a rearwardly extending handle pivotally mounted on the so erected structure at the junction of the rear and bottom walls, through the ears and side walls; said handle acting to lock the structure in its erected condition and also acting to anchor same in position on an automobile seat when inserted between the seat and back cushions thereof.

2. A structure of the type defined in claim 1 and further distinguished by the side and top walls having door sections bounded on three sides by perforations and on the fourth side by a scored hinge line; said sections being frangible, to afford access to the interior of the arm rest.

References Cited in the file of this patent

UNITED STATES PATENTS

| | | |
|---|---|---|
| 2,160,282 | Rehg | May 30, 1939 |
| 2,524,659 | Gorman | Oct. 3, 1950 |
| 2,531,302 | Schwennicke | Nov. 21, 1950 |
| 2,692,638 | Castell | Oct. 26, 1954 |
| 2,804,125 | Adams | Aug. 27, 1957 |